(12) United States Patent
Meng et al.

(10) Patent No.: US 11,221,441 B2
(45) Date of Patent: Jan. 11, 2022

(54) DISPLAY PANEL, DISPLAY APPARATUS AND DRIVING METHOD THEREOF

(71) Applicant: BOE TECHNOLOGY GROUP CO., LTD., Beijing (CN)

(72) Inventors: Xiandong Meng, Beijing (CN); Wei Wang, Beijing (CN); Jifeng Tan, Beijing (CN); Xianqin Meng, Beijing (CN); Wenqing Zhao, Beijing (CN); Qiuyu Ling, Beijing (CN); Xiaochuan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 41 days.

(21) Appl. No.: 16/640,802

(22) PCT Filed: Aug. 29, 2019

(86) PCT No.: PCT/CN2019/103259
§ 371 (c)(1),
(2) Date: Feb. 21, 2020

(87) PCT Pub. No.: WO2020/093766
PCT Pub. Date: May 14, 2020

(65) Prior Publication Data
US 2021/0141139 A1     May 13, 2021

(30) Foreign Application Priority Data
Nov. 8, 2018 (CN) .......................... 201811324259.6

(51) Int. Cl.
*F21V 8/00* (2006.01)
*G02F 1/1335* (2006.01)
*G02F 1/13357* (2006.01)

(52) U.S. Cl.
CPC ....... *G02B 6/005* (2013.01); *G02F 1/133512* (2013.01); *G02F 1/133615* (2013.01);
(Continued)

(58) Field of Classification Search
None
See application file for complete search history.

(56) References Cited

U.S. PATENT DOCUMENTS

2004/0240232 A1* 12/2004 Choi .................... G02B 6/0038
362/583
2004/0246743 A1 12/2004 Lee et al.
(Continued)

FOREIGN PATENT DOCUMENTS

CN          1573462 A       2/2005
CN       202947082 U   *    5/2013
(Continued)

OTHER PUBLICATIONS

English translation of CN-107238974-A, Title: Backlight source and liquid crystal display module, Author: Tan Jifeng; Zhao Wenqing; Wang Wei; Chen Xiaochuan; Meng Xian Dong; Date of publication: Oct. 10, 2017 (Year: 2017).*

(Continued)

*Primary Examiner* — Shan Liu
(74) *Attorney, Agent, or Firm* — Westerman, Hattori, Daniels & Adrian, LLP (57) ABSTRACT

A light collimation structure includes a light guide plate (1) and a light extraction unit (2) on the light guide plate (1). The light extraction unit (2) may be configured to take out lights having a filtered first color having a narrow band of spectrum, a filtered second color having a narrow band of spectrum, and a filtered third color having a narrow band of
(Continued)

spectrum in the light guide plate (1) to provide a collimated first color light, a collimated second color light and a collimated third color light.

18 Claims, 9 Drawing Sheets

(52) U.S. Cl.
CPC ...... *G02F 1/133621* (2013.01); *G02B 6/0031* (2013.01); *G02F 2203/30* (2013.01)

(56) References Cited

U.S. PATENT DOCUMENTS

| | | | |
|---|---|---|---|
| 2009/0190072 A1* | 7/2009 | Nagata | G02B 6/0028 349/96 |
| 2016/0085118 A1* | 3/2016 | Lee | G02F 1/29 349/62 |
| 2016/0265749 A1* | 9/2016 | Inada | G03B 21/204 |
| 2017/0090096 A1* | 3/2017 | Fattal | G02B 27/425 |
| 2017/0269279 A1* | 9/2017 | Wyatt | H01L 33/502 |
| 2018/0203294 A1* | 7/2018 | Chen | G02B 6/0026 |
| 2020/0025993 A1* | 1/2020 | Fattal | G02B 6/0038 |

FOREIGN PATENT DOCUMENTS

| | | | | |
|---|---|---|---|---|
| CN | 202947082 U | 5/2013 | | |
| CN | 106662700 A | 5/2017 | | |
| CN | 107238974 A | * 10/2017 | ............ | G02B 6/005 |
| CN | 107238974 A | 10/2017 | | |
| CN | 108227068 A | 6/2018 | | |
| CN | 108572482 A | 9/2018 | | |
| CN | 207882620 U | 9/2018 | | |
| CN | 108710240 A | 10/2018 | | |
| CN | 109212834 A | 1/2019 | | |
| JP | H06160852 A | 6/1994 | | |

OTHER PUBLICATIONS

English translation of CN-202947082-U, Title: Collimation system, backlight source and displaying device, Author: Wang Sheng; Date of publication: May 22, 2013 (Year: 2013).*
Office Action dated Mar. 30, 2020, issued in counterpart CN Application No. 201811324259.6, with English Translation. (25 pages).
Office Action dated Jun. 11, 2020, issued in counterpart CN Application No. 201811324259.6, with English Translation. (18 pages).
International Search Report dated Nov. 26, 2019, issued in counterpart Application No. PCT/CN2019/103259. (12 pages).

* cited by examiner

Related Art

DISPLAY PANEL, DISPLAY APPARATUS AND DRIVING METHOD THEREOF

CROSS-REFERENCE TO RELATED APPLICATIONS

This application claims benefit of the filing date of Chinese Patent Application No. 201811324259.6 filed on Nov. 8, 2018, the disclosure of which is hereby incorporated in its entirety by reference.

TECHNICAL FIELD

The disclosure relates to the field of display technology, in particular, to a display panel, a display apparatus and a driving method thereof.

BACKGROUND

At present, the light extraction grating of backlight can only take out a collimated light of a single color. That is, the light source can only emit monochromatic light. Thus, this is essentially a monochromatic display scheme.

BRIEF SUMMARY

An embodiment of the present disclosure provides a light collimation structure. The light collimation structure may include a light guide plate and a light extraction unit on the light guide plate. The light guide plate includes a light exiting side, a side opposite the light exiting side, and a light incident side connecting with the light exiting side and the side opposite the light exiting side. The light extraction unit may be configured to take out lights having a filtered first color having a narrow band of spectrum, a filtered second color having a narrow band of spectrum, and a filtered third color having a narrow band of spectrum in the light guide plate to provide a collimated first color light, a collimated second color light and a collimated third color light.

Optionally, the light collimation structure further comprises a filter film on the light guide plate, wherein the filter film is configured to filter lights having a first color, a second color and a third color into the lights having the filtered first color having a narrow band of spectrum, the filtered second color having a narrow band of spectrum, and the filtered third color having a narrow band of spectrum.

Optionally, the light extraction unit comprises a grating structure comprising a plurality of sub-gratings, and a first light shielding layer which is at a first distance from the grating structure, the first light shielding layer comprising first absorption portions and first transmission portions which are alternately arranged in an array, and the first absorption portions and the first transmission portions are spaced apart from one another.

Optionally, one of the first transmission portions is between every two adjacent first absorption portions.

Optionally, an orthographic projection of each of the first light transmission portions on the light guide plate completely covers an orthographic projection of one of the plurality of sub-gratings on the light guide plate.

Optionally, the filter film is on the light incident side of the light guide plate and the light extraction unit is on the light-exiting side of the light guide plate.

Optionally, the light extraction unit further comprises a transition layer between the first light shielding layer and the grating structure, the first light shielding layer is on a surface of the transition layer opposite from the light guide plate, and the grating structure is in contact with the light guide plate and embedded into the transition layer.

Optionally, the light extraction unit further comprises a transition layer between the first light shielding layer and the grating structure, the transition layer is filled into the first transmission portions of the first light shielding layer and has a same height in a direction of perpendicular to a surface of the light-exiting side of the light guide plate as each of the first transmission portions, and the grating structure is in contact with the light guide plate and embedded into the transition layer.

Optionally, the filter film is on the light exiting side of the light guide plate, the light extraction unit is on a side of the filter film opposite from the light guide plate, and the light extraction unit further comprises a transition layer between the first light shielding layer and the grating structure, the first light shielding layer is on a surface of the transition layer opposite from the light guide plate, and the grating structure is in contact with the filter film and embedded into the transition layer.

Optionally, the filter film is on the light exiting side of the light guide plate, the light extraction unit is on a side of the filter film opposite from the light guide plate, and the light extraction unit further comprises a transition layer between the first light shielding layer and the grating structure, the transition layer is filled into the first transmission portions of the first light shielding layer and has a same height in a direction of perpendicular to a surface of the light-exiting side of the light guide plate as each of the first transmission portions, and the grating structure is in contact with the filter film and embedded into the transition layer.

Optionally, the transition layer comprises a resin layer having a reflective index in a range of 1 to 1.35 or an air gap.

Optionally, the grating structure is a reflective grating structure and on the side opposite from the light exiting side of the light guide plate and the first light shielding layer is on the light exiting side of the light guide plate.

Optionally, a metal layer is coated on the grating structure to form the reflective grating structure, and the metal layer comprises gold or silver.

Optionally, the filter film is on the light incident side of the light guide plate or between the reflective grating structure and the light guide plate.

Optionally, the filter film comprises a first color sub-film, a second color sub-film, and a third color sub-film on the light-exiting side of the light guide plate; the first color sub-film, the second color sub-film, and the third color sub-film are configured to filter the lights having the first color, the second color and the third color into a light having the filtered first color having a narrow band of spectrum, a light having the filtered second color having a narrow band of spectrum, and a light having the filtered third color having a narrow band of spectrum respectively; one of the plurality of sub-gratings are on a side of the first color sub-film, the second color sub-film, and the third color sub-film opposite from light guide plate respective, and is configured to take out the light having the filtered first color having a narrow band of spectrum, the light having the filtered second color having a narrow band of spectrum, and the light having the filtered third color having a narrow band of spectrum to provide the collimated first color light, the collimated second color light and the collimated third color light, respectively.

Optionally, the light extraction unit further comprises a transition layer, and the transition layer covers the grating structure and the filter film.

Optionally, the light collimation structure further comprises a light emitting unit disposed on the light incident side of the light guide plate for providing the lights having the first color, the second color and the third color to the light guide plate; wherein the light emitting unit comprises a light source which is a white light LED, which emits the lights having the first color, the second color and the third color; and a reflector for collimating the lights having the first color, the second color and the third color to form collimated lights and causing the collimated lights to be transmitted in the light guide plate in a total reflection manner.

Optionally, the light collimation structure further comprises a light emitting unit disposed on the light incident side of the light guide plate for providing the lights having the filtered first color, the filtered second color and the filtered third color to the light guide plate; wherein the light emitting unit comprises a light source comprising a plurality of narrow band spectral LEDs, which emit the lights having the filtered first color, the filtered second color and the filtered third color; and a reflector for collimating the lights having the filtered first color, the filtered second color and the filtered third color to form collimated lights and causing the collimated lights to be transmitted in the light guide plate in a total reflection manner.

One embodiment of the present disclosure provides a display apparatus, comprising the light collimation structure according to one embodiment of the present disclosure, and a display panel on the light exiting side of the light guide plate.

Optionally, the display panel comprises a gray scale control unit, which is configured to adjust transmission state of the collimated first color light, the collimated second color light and the collimated third color light.

Optionally, the gray scale control unit comprises a liquid crystal layer; a second light shielding layer on a side of the liquid crystal layer opposite from the light guide plate, the second light shielding layer comprising second absorption portions and second transmission portion which are alternately arranged in an array, and the second absorption portions and the second transmission portions are spaced apart from one another and a control electrode, wherein the control electrode is configured to adjust deflection direction of liquid crystals in the liquid crystal layer and accordingly propagation direction of the collimated first color light, the collimated second color light and the collimated third color light incident on the liquid crystal layer such that each of the collimated first color light, the collimated second color light and the collimated third color light emitted from the liquid crystal layer is either absorbed by the second absorption portions or passed through the second light transmission portions, thereby adjusting the gray scale of the display panel.

Optionally, an orthographic projection of each of the second absorption portions on the light guide plate at least partially overlaps an orthographic projection of one of the plurality of sub-gratings on the light guide plate, respectively.

Optionally, the gray scale control unit further comprises a third light shielding layer, wherein the third light shielding layer comprises a plurality of third absorption portions, and each of the third absorption portions is disposed in the same layer as the second light shielding layer.

Optionally, the third absorption portions are in one-to-one correspondence with the second transmission portions, and each of the third absorption portions divide one of the second transmission portions into a first sub-transmission portion and a second sub-transmission portion.

BRIEF DESCRIPTION OF THE DRAWINGS

The drawings are used to provide a further understanding of the technical solutions of the present disclosure, and constitute a part of the specification, which together with the embodiments of the present application are used to explain the technical solutions of the present disclosure, and do not constitute a limitation of the technical solutions of the present disclosure. The shapes and sizes of the various components in the drawings do not reflect true proportions, and are merely intended to illustrate the present disclosure.

DETAILED DESCRIPTION

The specific embodiments of the display panel, display apparatus and driving method provided by the embodiments of the present disclosure are described in detail below with reference to the accompanying drawings. It is understandable that the preferred embodiments described herein are intended to illustrate and explain the disclosure and are not intended to limit the disclosure. The embodiments in the present application and the features in the embodiments can be recombined with one another without causing conflicts. It should be noted that the dimensions and shapes of the various figures in the drawings do not reflect the true proportions, and are merely intended to illustrate the present disclosure. The same or similar reference numerals indicate the same or similar elements or elements having the same or similar functions.

Figure 1:
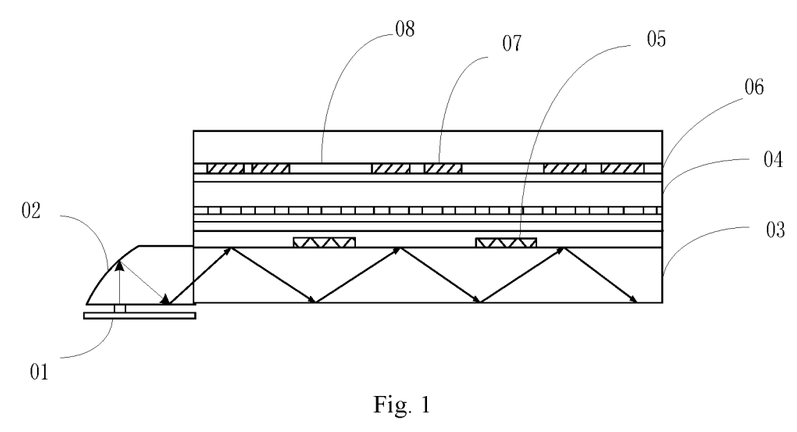
FIG. 1 is a schematic view showing the structure of a display apparatus in the prior art.

As shown in FIG. 1, the current display apparatus couples Lambertian light emitted by a LED light source 01 into a light guide plate 03 through a free surface reflection mirror 02, and the light transmits in the light guide plate 03 in a total reflection manner. Extraction gratings 05 are disposed on the light-exiting surface or the bottom surface (the surface opposite the light-emitting surface) of the light guide plate 03. The extraction grating 05 is configured to take out a large-angle light that is totally reflected and propagated in the light guide plate 03 at a collimation angle, thereby realizing a collimated light source with high transmittance (most of the background light can pass). Then, an array type light shielding layer 07 is disposed above the extraction gratings 05 through structural design, and the collimated light emitted from the extraction gratings 05 is absorbed by the light shielding layer to realize a dark state (L0). When a bright state (L255) is displayed, the liquid crystal layer 04 is given a set of voltage signals so that the liquid crystals are deflected to form a liquid crystal grating. The incident light is then diffracted by the liquid crystal grating and emitted. Different voltage signals may be applied to the liquid crystal layer 04, so that different diffraction efficiencies of the liquid crystal grating to the incident light can be realized, thereby realizing multi-gray scale display. However, the above display apparatus has the following problems in its structure:

A color display needs the light to pass through the POL (polarizer) and the color film structure 06. The light extraction grating 05 can only take out a single color of light with collimation, and the LED light source can only emit monochromatic light. Thus, a monochromatic display scheme is realized by the backlight assembly. Therefore, it is necessary to provide a colored display scheme that is advantageous for industrialization.

Accordingly, in one embodiment of the present disclosure, a display panel is provided as shown in FIG. 2 to FIG. 6. The display panel includes the following:

A light guide plate 1 is configured to transmit light incident on the light guide plate 1 in a total reflection manner. The light guide plate includes a light exiting side, a side opposite the light exiting side, and a light incident side connecting with the light exiting side and the side opposite the light exiting side.

A light extraction unit 2 on the light guide plate, which is configured to take out the light transmitted with the total reflection in the light guide plate 1 in the form of collimated, monochromatic light of a same color as the corresponding sub-pixel unit.

In one embodiment, the light extraction unit is configured to take out lights having a filtered first color having a narrow band of spectrum, a filtered second color having a narrow band of spectrum, and a filtered third color having a narrow band of spectrum in the light guide plate to provide a collimated first color light, a collimated second color light and a collimated third color light.

A gray scale control unit is configured for adjusting transmission state or intensity of the monochromatic light.

In one embodiment, the gray scale control unit is configured to adjust transmission state of the collimated first color light, the collimated second color light and the collimated third color light.

The display panel provided according to one embodiment of the present disclosure can realize the colored backlight effect without using the POL (polarizer) and the color film structure, and further realizes the colored display by the gray scale control unit. It also has certain advantages in transparent display and high-efficiency light utilization, and provides a good foundation for mass production.

The specific structure of the light extraction unit 2 may be various, as long as the light transmitted by the total reflection in the light guide plate 1 can be taken out in the form of collimated, monochromatic light of a corresponding color of the sub-pixel unit. In one embodiment, as shown in FIG. 2 to FIG. 5, the light extraction unit 2 includes a grating structure and a first light shielding layer.

The grating structure disposed on one side of the light guide plate includes a plurality of sub-gratings 21. The plurality of sub-gratings 21 is disposed in one-to-one correspondence with the sub-pixel units. Each of the sub-gratings 21 is configured to emit a different color of light at a different angle.

The first light shielding layer 23 is located on a side of the grating structure opposite from the light guide plate 1 for absorbing light of a color different from the sub-pixel unit corresponding to the sub-grating 21.

Specifically, the first light shielding layer 23 includes first absorption portions 231 and first light transmission portions 232 which are alternately arranged in an array and spaced apart. One of the first transmission portions is between every two adjacent first absorption portions. The first absorption portion 231 is configured to absorb the light of a color different from the sub-pixel unit corresponding to the sub-grating 21. The first light transmitting portion 232 is configured to transmit light of the same color as the sub-pixel unit corresponding to the sub-grating 21. The orthographic projection of the first light transmission portion 232 on the light guide plate 1 and the orthographic projection of the sub-grating on the light guide plate 1 are overlapped, so that the light transmitted by the total reflection in the light guide plate 1 is taken out as a collimated, monochromatic light of a corresponding color of the sub-pixel unit.

In one embodiment, the sub-pixel units generally include a red sub-pixel unit, a green sub-pixel unit, and a blue sub-pixel unit. A sub-grating 21 (named a red sub-grating) corresponding to the red sub-pixel unit will take out a red light in the light guide plate 1 by collimated diffraction. At the same time, the red sub-grating will diffract the light other than the red light such as green light and blue light at an oblique angle upward with non-collimation. The red light, the green light, and the blue light taken out through the red sub-grating are respectively incident on the first light shielding layer 23 at different angles. Wherein, the red light passes directly through the first light transmission portion 232, and the green light and the blue light are absorbed by the first absorption portion 231. Similarly, a sub-grating 21 (named a green sub-grating) corresponding to the green sub-pixel unit will take out a green light in the light guide plate 1 by collimated diffraction. At the same time, the green sub-grating will diffract the light other than the green light such as red light and blue light at an oblique angle upward with non-collimation. The red light, the green light, and the blue light taken out through the green sub-grating are respectively incident on the first light shielding layer 23 at different angles. Wherein, the green light passes directly through the first light transmission portion 232, and the red light and the blue light are absorbed by the first absorption portion 231. Similarly, a sub-grating 21 (named a blue sub-grating) corresponding to the blue sub-pixel unit will take out a blue light in the light guide plate 1 by collimated diffraction. At the same time, the blue sub-grating will diffract the light other than the blue light such as red light and green light at an oblique angle upward with non-collimation. The red light, the green light, and the blue light taken out through the blue sub-grating are respectively incident on the first light shielding layer 23 at different angles. Wherein, the blue light passes directly through the first light transmission portion 232, and the red light and the green light are absorbed by the first absorption portion 231. Therefore, the light extraction unit 2 realizes the extraction of the monochromatic light corresponding to the colors of the sub-pixel units respectively. Specifically, the light incident on the red sub-pixel unit is only red monochromatic light, the light incident on the green sub-pixel unit is only green monochromatic light, and the light incident on the blue sub-pixel unit is only blue monochromatic light. As such, the color backlight effect is achieved.

Figure 2:
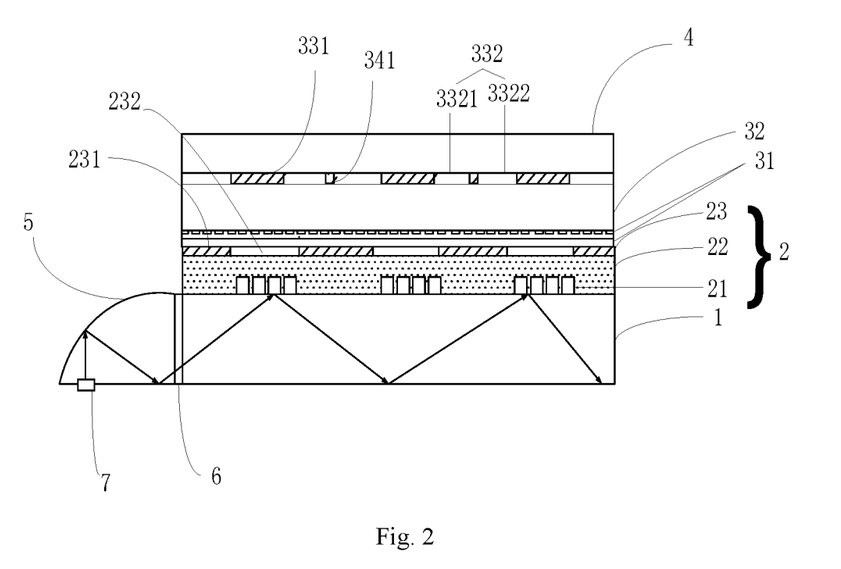
FIG. 2 is a schematic structural diagram of a display apparatus provided by one embodiment of the present disclosure.
Figure 3:
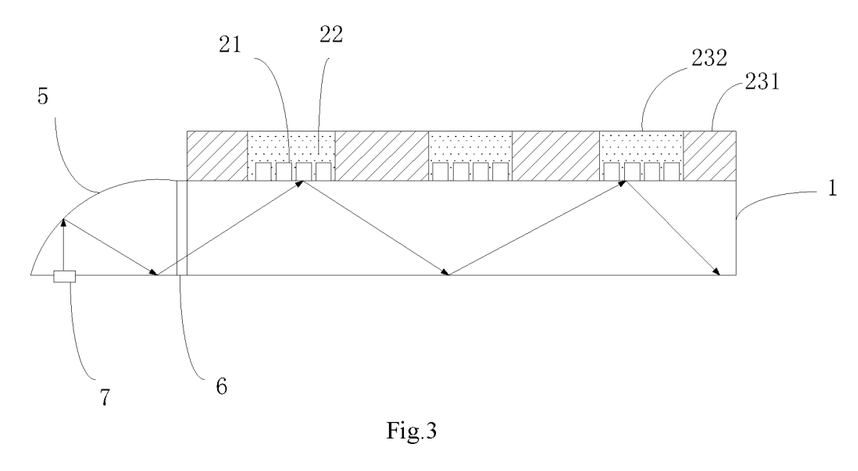
FIG. 3 is a schematic structural diagram of a display apparatus provided by one embodiment of the present disclosure.
Figure 4:
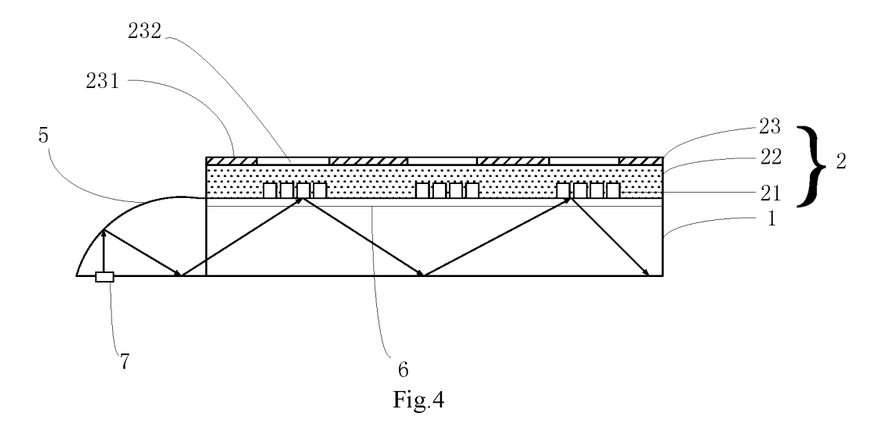
FIG. 4 is a schematic structural diagram of a display apparatus provided by one embodiment of the present disclosure.

In one implementation of the present embodiment, as shown in FIG. 2 to FIG. 4, the grating structure is transmissive and located on the light exiting side of the light guide plate 1. The first light shielding layer 23 is located on a side of the grating structure opposite from the light guide plate 1.

In order to ensure that the light taken out by the light extraction unit 2 is the same monochromatic light as the color of the corresponding sub-pixel unit, a certain thickness support is required between the first light shielding layer 23 and the grating structure. Therefore, in one embodiment, the light extraction unit 2 further includes a transition layer 22 (first transition layer) between the grating structure and the first light shielding layer 23, as shown in FIG. 2 to FIG. 4. The first transition layer is disposed such that light of a plurality of colors having different angles taken out through the grating structure can be completely separated when propagating onto the first light shielding layer 23, thereby ensuring the light extraction unit 2 extracting monochromatic light of the same color as the corresponding sub-pixel unit, and further flattening and protecting the grating structure.

In one embodiment, as shown in FIG. 2, the light extraction unit further includes a transition layer between the first light shielding layer and the grating structure, the first light shielding layer is on a surface of the transition layer opposite from the light guide plate, and the grating structure is in contact with the light guide plate and embedded into the transition layer.

In one embodiment, the transition layer includes a resin layer having a reflective index in a range of 1 to 1.35. In one embodiment, the transition layer includes an air gap.

Figure 5:
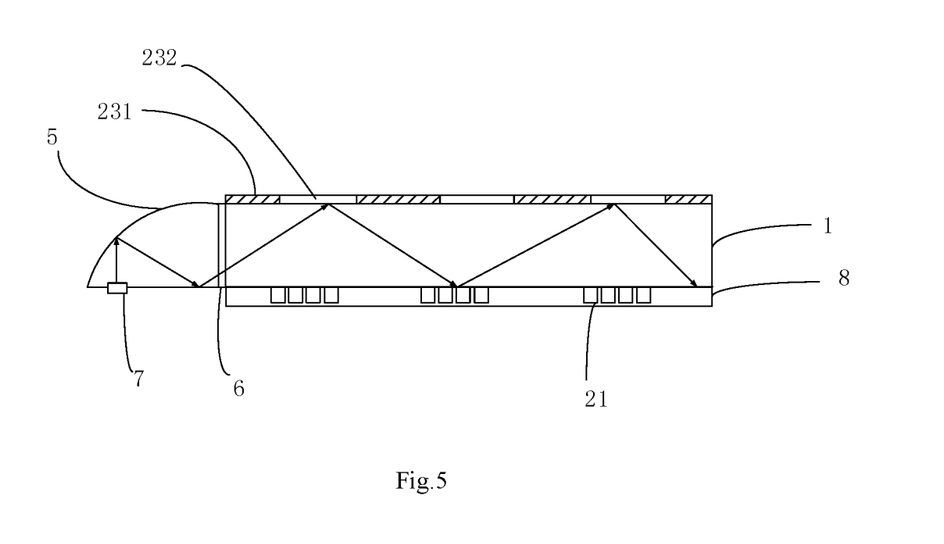
FIG. 5 is a schematic structural diagram of a display apparatus provided by one embodiment of the present disclosure.
Figure 6:
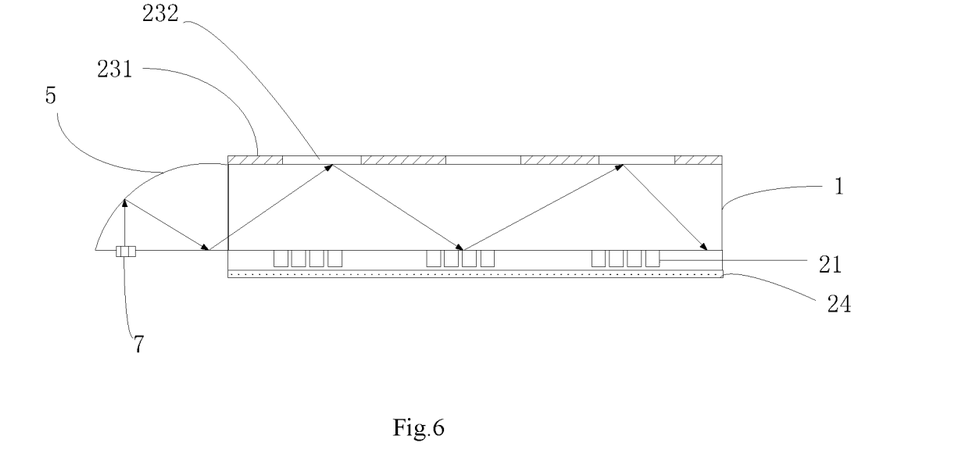
FIG. 6 is a schematic structural diagram of a display apparatus provided by one embodiment of the present disclosure.

In another implementation of the present embodiment, as shown in FIG. 5 and FIG. 6, the grating structure is reflective and located on a side of the light guide plate 1 opposite the light exiting side of the light guide plate 1. The first light shielding layer 23 is disposed on a side of the light guide plate 1 opposite from the grating structure.

Specifically, a metal layer 8 is coated on the outside of the grating structure to form a reflective grating structure to improve the utilization of light energy. The metal layer 8 can be made of metal such as gold or silver, but is not limited thereto.

In this embodiment, a transition layer 22 (second transition layer) is between the light guide plate 1 and the metal layer.

In this embodiment, the light guide plate 1 itself can be used as support, so that the first light shielding layer can be directly disposed on the light exiting surface of the light guide plate 1. Then, the second transition layer does not need to serve as support, and only needs to be flat and provide protection. As such, the thickness of the transition layer 22 is reduced, and the thickness of the overall apparatus is sufficiently reduced.

The specific structure of the first light shielding layer 23 can be various. In one embodiment, as shown in FIG. 2, FIG. 4, FIG. 5 and FIG. 6, the first light shielding layer 23 is disposed on a side of the first transition layer opposite from the grating structure. The first light shielding layer 23 includes first absorption portions 231 and first light transmission portions 232 distributed in an array and spaced apart. The first absorption portion 231 is used to absorb light of a color different from a sub-pixel unit corresponding to the sub-grating 21. The first light-transmission portion 232 is configured to transmit light of the same color as the sub-pixel unit corresponding to the sub-grating 21. The orthographic projection of the absorption portion 231 on the light guide plate 1 is located on both sides of the orthographic projection of the sub-grating 21 on the light guide plate 1, and orthographic projection of the first light transmission portion 232 on the light guide plate 1 overlaps the orthographic projection of the sub-grating 21 on the light guide plate 1.

In one embodiment, as shown in FIG. 3, the first light shielding layer 23 includes first absorption portions 231 and first light transmission portions 232, distributed in an array and spaced apart. The first absorption portion 231 is configured to absorb light of a color different from a sub-pixel unit corresponding to the sub-grating 21. The first light transmission portion 232 is configured to transmit light of the same color as the sub-pixel unit corresponding to the sub-grating 21. The first absorption portion 231 is located at two sides of the sub-grating 21. The first transition layer is filled into the first transparent portion 232 and is the same height as the first absorption portions 231. The orthographic projection of the light transmission portion 232 on the light guide plate 1 overlaps the orthographic projection of the sub-grating 21 on the light guide plate 1. The thickness of the first light shielding layer 23 is higher than the thickness of the grating structure, thereby avoiding light leakage to cause color mixing phenomenon. The thickness of the first absorption portion 231 in FIG. 3 is increased compared to the structure of the first light shielding layer 23 shown in FIGS. 2, 4, and 5, thereby effectively ensuring the light extraction unit 2 taking out the monochromatic light of the same color as the corresponding sub-pixel unit.

In this implementation, the first light shielding layer functions to absorb and filter the light and serve as a support.

In one embodiment, the specific settings of the light extraction unit 2 are as follows:

The spectral distribution of the light beam in the light guide plate 1 after passing through the filter film 6 is as follows:

R: 625+/−10 nm; G: 525+/−10 nm; B: 425+/−10 nm;

The transmission angle of the light beam in the light guide plate 1 is: 65+/−5°;

The grating structure includes a red sub-grating, a green sub-grating and a blue sub-grating. The light corresponding to the center wavelengths of the red sub-grating, the green sub-grating and the blue sub-grating respectively is diffracted upward from the light guiding plate 1 while ensuring high diffraction efficiency.

The period P of each sub-grating 21 can be calculated according to the grating formula, and the height and duty ratio of the sub-grating 21 can be optimized according to simulation software.

Grating Formula:

$$n_1 \sin \theta_1 - n_2 \sin \theta_2 = m\lambda/P \tag{1},$$

wherein $n_1$ is the refractive index of the incident light in the light guide plate 1, $\theta_1$ is incident angle, $n_2$ is the refractive index of the medium where the diffracted ray is located. In this embodiment, it is the refractive index of the diffracted ray in the first transition layer or the second transition layer, $\theta_2$: diffraction angle, here is equal to 0, m: diffraction order, +1 or −1 level, λ: center wavelength, P: grating period, According to the above formula (1), the periods of the red sub-grating (R), the green sub-grating (G) and the blue sub-grating (B) can be respectively calculated;

In one embodiment, the sub-grating 21 material is SiNx with a refractive index of 1.92, and the sub-grating 21 parameters are as follows:

| sub-grating 21 parameters | | | |
|---|---|---|---|
| wavelength | B/425@415-435 | G/525@515-535 | R/625@615-635 |
| period | 308 nm | 381 nm | 454 nm |
| duty ratio | 60% | 60% | 60% |
| groove depth | 287 nm | 330 nm | 421 nm |

Figure 8:
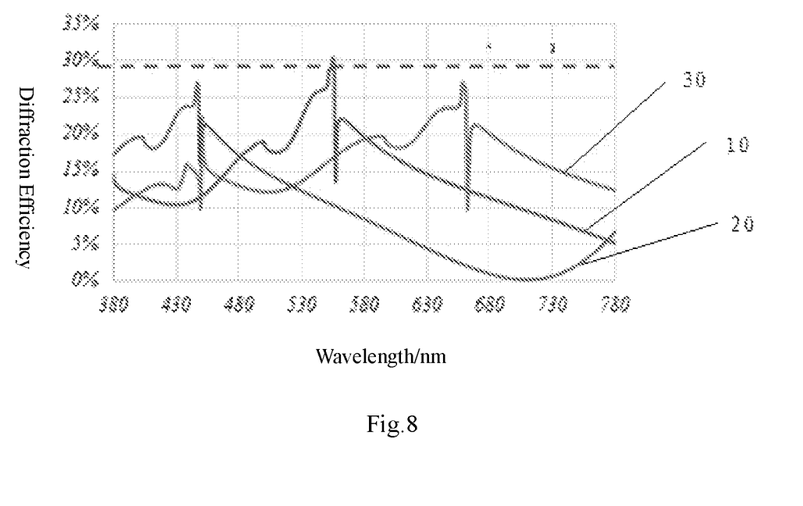
FIG. 8 is a graph showing diffraction efficiency of a red sub-grating, a green sub-grating, and a blue sub-grating versus wavelength of light according to one embodiment of the present disclosure.

The diffraction efficiency of the red sub-grating (R), the green sub-grating (G), and the blue sub-grating (B) for different wavelengths of light is as shown in FIG. 8, wherein line 10 represents the schematic diffraction efficiency of the green sub-grating (G), line 20 represents the schematic diffraction efficiency of the blue sub-grating (B), and line 30 represents the schematic diffraction efficiency of the red sub-grating (R).

The light-emitting angles of red, green, and blue light diffracted by the red sub-grating (R), the green sub-grating (G), and the blue sub-grating (B) respectively are as follows:

| | Blue light | Green light | Red light |
|---|---|---|---|
| Blue sub-grating | −4.4~3.7 | −19.7~−11.2 | −36.6~−27.1 |
| Green sub-grating | 8.0~15.7 | −4.1~1.1 | −16.3~−8.6 |
| Red sub-grating | 16.6~22.1 | 6.3~16.3 | −3.7~3.3 |

As can be seen from FIG. 8 and the above table, after diffracted by each sub-grating 21, only the light of the same color as the corresponding sub-pixel unit is collimated, and the light of the color different from the corresponding sub-pixel unit is emitted at an oblique angle.

The thickness of the transition layer 22 is ultimately determined by the green light taken under the parameters of the red sub-grating. The minimum light exiting angle of the green light is +6.3°. Therefore, the relationship between the thickness h of the transition layer 22 and the width "a" of the first light transmission portion 232 is:

$$a/h > \tan 6 = 0.1,$$

Figure 9:
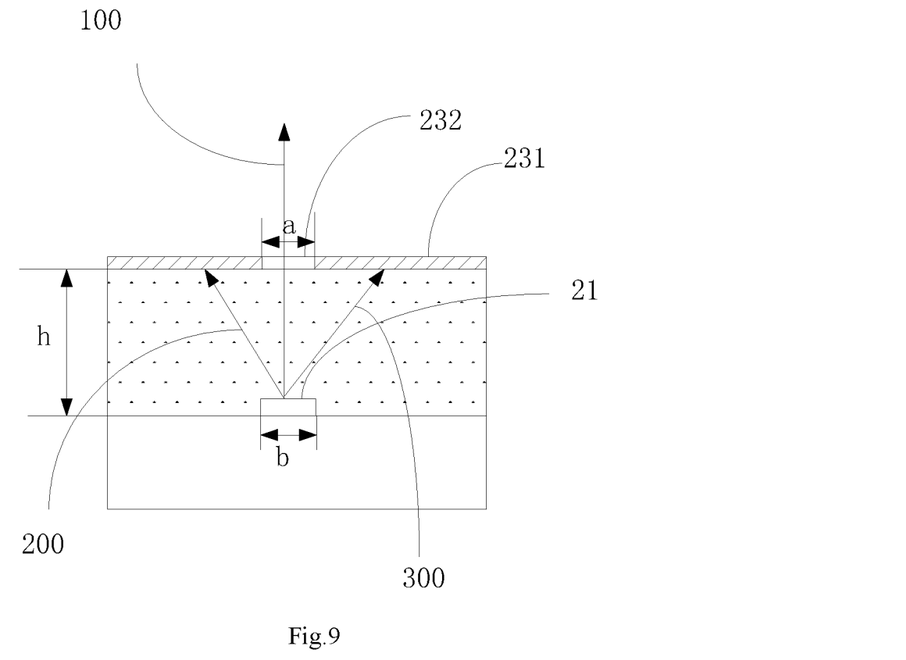
FIG. 9 is a schematic view showing light propagation direction after diffraction by a red sub-grating according to one embodiment of the present disclosure.

In FIG. 9, an arrow 100 indicates an outgoing direction of red light which is emitted after being diffracted by a red sub-grating, an arrow 200 indicates an outgoing direction of green light which is emitted after being diffracted by a red sub-grating, and an arrow 300 indicates an outgoing direction of blue light which is emitted after being diffracted by a red sub-grating. The width b of the red sub-grating shown in FIG. 9 is the same as the width a of the first light transmission portion 232, both being 16 nm, and the thickness h of the transition layer 22 is 160 nm, but not limited thereto.

As shown in FIG. 9, due to a certain thickness of the transition layer 22, the first absorption portion 231 of the first light shielding layer absorbs light of a color different from the corresponding sub-pixel unit, and the first light transmission portion 232 of the first light shielding layer transmits light of the same color as the corresponding sub-pixel unit, thereby finally realizing a precise monochromatic backlight scheme by the light extraction unit 2.

Based on this principle, the sub-grating 21, the transition layer 22 and the first light shielding layer are disposed correspondingly at the position of each of the R, G, and B sub-pixel units, thereby realizing finally colored dot matrix collimated backlight scheme.

In one embodiment, the grayscale control unit includes a liquid crystal layer 32, a second light shielding layer, and a control electrode.

The second light shielding layer, which is disposed on a side of the liquid crystal layer opposite from the light guide plate, includes second absorption portions and second light transmission portions which are alternately arranged in an array, and the second absorption portions and the second transmission portions are spaced apart from one another. Orthographic projection of the second absorption portion on the light guide plate at least partially overlaps orthographic projection of the grating structure of the corresponding sub-pixel unit on the light guide plate.

The control electrode 31 is used for adjusting deflection direction of the liquid crystals, and accordingly adjusting propagation direction of the monochromatic light incident on the liquid crystal layer 32. As such, the monochromatic light emitted from the liquid crystal layer is absorbed by the second absorption portion or passed through the second light transmission portion, thereby adjusting the gray scale.

In one embodiment, the control electrode is configured to adjust deflection direction of liquid crystals in the liquid crystal layer and accordingly propagation direction of the collimated first color light, the collimated second color light and the collimated third color light incident on the liquid crystal layer such that each of the collimated first color light, the collimated second color light and the collimated third color light emitted from the liquid crystal layer is either absorbed by the second absorption portions or passed through the second light transmission portions, thereby adjusting the gray scale of the display panel.

The liquid crystal layer 32 is supplied with different voltages through the control electrode 31 to adjust the gray scale of the display panel. Wherein, when the voltage supplied by the electrode to the liquid crystal layer 32 is zero, light emitted from the display panel is incident on the second light shielding layer and is absorbed by the second absorption portions 331 to display a dark state. When the voltage supplied by to the liquid crystal layer 32 is not zero, the liquid crystals are deflected to form a liquid crystal grating. After the light emitted by the display panel passes through the liquid crystal grating, and the exiting angle is deflected. Accordingly, the exiting light is not absorbed by the second absorption portions 331 of the second light shielding layer, but passes through the second light transmission portions 332 to display a bright state.

In one embodiment, the control electrode 31 includes a slit electrode and a plate electrode distributed in an advanced super-dimensional field mode.

In one embodiment, the orthographic projection of the second absorption portion 331 on the light guide plate 1 completely overlaps the orthographic projection of the grating structure of the corresponding sub-pixel unit on the light guide plate 1. When the voltage supplied by the control electrode to the liquid crystal layer 32 is zero, light emitted from the display panel can be directly transmitted through the liquid crystal layer 32. The monochromatic light extracted from the light extraction unit 2 and corresponding to the corresponding sub-pixel unit is absorbed by the second absorption portions 331 to realize a dark state display. When the voltage supplied by the control electrode to the liquid crystal layer 32 is not zero, the liquid crystals are deflected to form a liquid crystal grating. After the light emitted by the display panel passes through the liquid crystal grating, the exiting angle is deflected, so that the same monochromatic light as the corresponding sub-pixel unit from the light extraction unit 2 is emitted from the second light transmission portions 332 to realize a bright state display.

In the bright state display, the driving voltage of the control electrode 31 is adjusted so that the liquid crystal grating is formed by the liquid crystal layer 32 to disperse the collimated light to deviate from the second absorption portion 331 of the second light shielding layer, thereby realizing a bright state display. As for different driving voltages, the liquid crystal grating has different diffraction effects. As such, the light energy deviating from the second absorption portion 331 is different, thereby realizing gray scale modulation display.

In one embodiment, the gray scale control unit further includes a third light shielding layer, which includes a plurality of third absorption portions 341. The third absorption portion 341 is disposed between adjacent sub-pixel units and is also disposed in the same layer as the second light shielding layer. As shown in FIG. 2, the third light shielding layer includes a plurality of third absorption portions 341 corresponding to the second light transmission portions 332. Each of the third absorption portions 341 corresponds to one of the second light transmission portions 332. Each third absorption portion 341 divides a second light transmission portion 332 into a first sub-light transmission portion 3321 and a second sub-transmission portion 3322. The third light-shielding layer functions as an occlusion absorption to prevent the occurrence of color mixing, and the application of the third light shielding layer further ensures that the light incident on each sub-pixel unit is monochromatic light.

One embodiment of the present disclosure further provides a display apparatus, including the above display panel. The display apparatus further comprises a light-emitting unit and an upper substrate.

In one embodiment, the light-emitting unit is disposed on the light-incident side of the light guide plate 1 for providing light to the light guide plate 1, and the light can be totally reflected inside the light guide plate 1;

The upper substrate 4 is located on a side of the liquid crystal layer opposite from the light guide plate 1.

In this embodiment, the upper substrate 4 may be a glass substrate of a conventional TFT-LCD (Thin Film Transistor-Liquid Crystal Display) display apparatus, which requires high transparency and good surface flatness.

In one embodiment, as shown in FIG. 2 to FIG. 5, the light-emitting unit includes:

a light source 7 which is a white light LED;

a reflector 5 for collimating the light emitted by the light source 7 and causing the collimated light to be transmitted in the light guide plate 1 in a total reflection manner; and a filter film 6 disposed on the light incident side or the light exit side of the light guide plate 1 for filtering white light incident on the light guide plate 1 into light of a narrow band spectrum (light with a spectral width of 10±2 nm).

In one embodiment, the filter film is configured to filter lights having a first color, a second color and a third color into the lights having the filtered first color having a narrow band of spectrum, the filtered second color having a narrow band of spectrum, and the filtered third color having a narrow band of spectrum.

In one embodiment, the reflector 5 is a curved surface structure, or a free curved surface structure, etc. It collimates and couples the light emitted by the white LED into the light guide plate 1 and causes the light to transmit in a total reflection manner in the light guide plate 1.

In one embodiment, the filter film 6 is configured to filter the light emitted by the white LED into a narrow band spectrum light of three colors. When the color corresponding to the sub-pixel unit includes three colors of RGB, the light emitted by the white LED is filtered by the filter film 6 into three colors of RGB light, and the light of three colors of RGB is diffracted into light having different discrete angles by the grating structure. The first light shielding layer 23 will take out the monochromatic light of the same color as the corresponding sub-pixel unit.

The filter film 6 can be disposed in various positions, like disposed on the light incident side of the light guide plate 1, as shown in FIG. 2, FIG. 3 and FIG. 5, or can be disposed on the light exiting side of the light guide plate 1, as shown in FIG. 4.

In one embodiment, as shown in FIG. 6, the light emitting unit includes:

a light source 7, comprising a plurality of narrowband spectral LEDs which emit light of different colors;

a reflector 5 configured to collimate the light emitted by the light source 7 and causing the collimated light to be transmitted in the light guide plate 1 in a total reflection manner;

In this embodiment, the arrangement of the filter film 6 can be omitted.

In one embodiment, a light emitting unit is disposed on the light incident side of the light guide plate for providing the lights having the filtered first color, the filtered second color and the filtered third color to the light guide plate. The light emitting unit comprises a light source comprising a plurality of narrow band spectral LEDs, which emit the lights having the filtered first color, the filtered second color and the filtered third color; and a reflector for collimating the lights having the filtered first color, the filtered second color and the filtered third color to form collimated lights and causing the collimated lights to be transmitted in the light guide plate in a total reflection manner.

Figure 7:
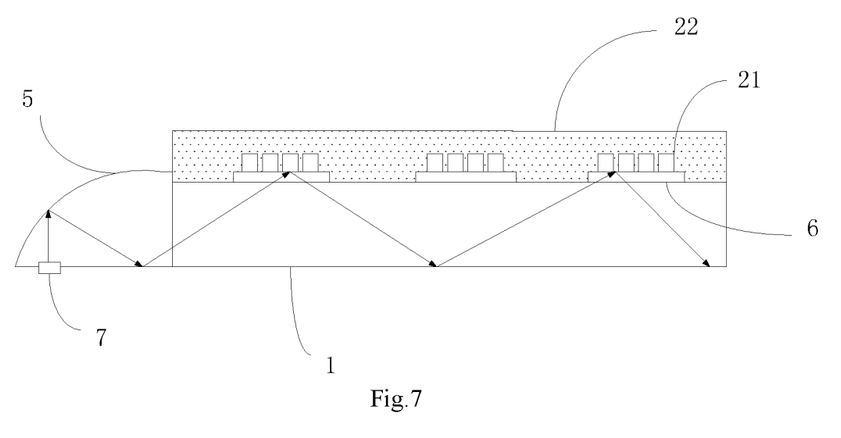
FIG. 7 is a schematic structural diagram of a display apparatus provided by one embodiment of the present disclosure.

In one embodiment, as shown in FIG. 7, the light emitting unit includes:

a light source 7, which is a white light LED; and a reflector 5 for collimating the light emitted by the light source 7 and causing the collimated light to be transmitted in the light guide plate 1 in a total reflection manner.

In one embodiment, a light emitting unit is disposed on the light incident side of the light guide plate for providing the lights having the first color, the second color and the third color to the light guide plate. The light emitting unit comprises a light source which is a white light LED, which emits the lights having the first color, the second color and the third color; and a reflector for collimating the lights having the first color, the second color and the third color to form collimated lights and causing the collimated lights to be transmitted in the light guide plate in a total reflection manner.

In one embodiment, a filter film 6 is disposed on a light exiting side of the light guide plate 1, and located between the grating structure and the light guide plate 1. The filter film corresponds to each of the sub-gratings, and is used to filter white light incident on the light guide plate 1 into light of a narrow band spectrum (light with a spectral width of 10±2 nm) having the same color as that of the corresponding sub-pixel unit.

In one embodiment, the filter film includes a first color sub-film, a second color sub-film, and a third color sub-film on the light-exiting side of the light guide plate. The first color sub-film, the second color sub-film, and the third color sub-film are configured to filter the lights having the first color, the second color and the third color into a light having the filtered first color having a narrow band of spectrum, a light having the filtered second color having a narrow band of spectrum, and a light having the filtered third color having a narrow band of spectrum respectively. one of the plurality of sub-gratings are on a side of the first color sub-film, the second color sub-film, and the third color sub-film opposite from light guide plate respective, and is configured to take out the light having the filtered first color having a narrow band of spectrum, the light having the filtered second color having a narrow band of spectrum, and the light having the filtered third color having a narrow band of spectrum to provide the collimated first color light, the collimated second color light and the collimated third color light, respectively. The light extraction unit may further include a transition layer, and the transition layer covers the grating structure and the filter film.

In one embodiment, the sub-pixel unit includes three colors RGB, and the filter film includes a red filter film, a green filter film, and a blue filter film. The red filter film is disposed corresponding to the red sub-pixel unit, the green filter film is disposed corresponding to the green sub-pixel unit, and the blue filter film is disposed corresponding to the blue sub-pixel unit.

In this implementation, the arrangement of the first light shielding layer is omitted comparing to the structure of the display panel in FIGS. 2-6. The transition layer 22 provides flatness and protection so that the thickness of display panel is reduced.

The display apparatus may be any product or component having a display function, such as a liquid crystal television, a liquid crystal display, a digital photo frame, a mobile phone, a tablet computer, etc., wherein the display apparatus further includes a flexible circuit board, a printed circuit board, and a backboard.

One embodiment of the present disclosure also provides a driving method for driving the above display apparatus.

In one embodiment, the gray scale control unit includes:
a liquid crystal layer 32;
a second light shielding layer disposed on a side of the liquid crystal layer opposite from the light guide plate, including second absorption portions and second light transmission portions disposed at intervals, wherein orthographic projection of the second absorption portion on the light guide plate at least partially overlaps orthographic projection of the grating structure of the corresponding sub-pixel unit on the light guide plate;
a control electrode 31 for adjusting deflection direction of the liquid crystals to adjust propagation direction of the monochromatic light incident on the liquid crystal layer 32. The monochromatic light emitted from the liquid crystal layer is absorbed by the second absorption portion or passes through the second light transmission portion, thereby adjusting the gray scale.

The driving method according to one embodiment of the present disclosure includes the following steps:
When the voltage of the control electrode 31 to the liquid crystal layer 32 is zero, the light emitted by the display panel is absorbed by the second absorption portions of the second light shielding layer;
When the voltage of the control electrode 31 to the liquid crystal layer 32 is not zero, the light emitted from the display panel is deflected and exits from the second light-transmission portions of the second light-shielding layer.

In one embodiment, the gray scale control unit further includes a third light shielding layer, which includes a plurality of third absorption portions 341. The third absorption portion 341 is disposed between adjacent sub-pixel units, and is disposed in the same layer as the second light shielding layer. The third light shielding layer includes a plurality of third absorption portions corresponding to the second light transmission portions respectively. Each of the third absorption portions 341 divides the corresponding second light transmission portion into a first sub-transmission portion 3321 and a second sub-transmission portion 3322;

In one embodiment, the driving method includes the following steps:
When the voltage of the control electrode 31 to the liquid crystal layer 32 is zero, the light emitted by the display panel is absorbed by the second absorption portions 331 of the second light shielding layer;
When the voltage of the control electrode 31 to the liquid crystal layer 32 is not zero, the light emitted from the display panel is deflected, and is emitted from the first sub-transmission portions 3321 and/or the second sub-transmission portions 3322.

It should be noted that the arrows in FIGS. 1-7 show a schematic diagram of the transmission direction of the light emitted by the light source, and are not limited to the actual transmission path of the light.

The above is a preferred embodiment of the present disclosure, and it should be noted that those skilled in the art can make several improvements without departing from the principles of the present disclosure. It should also be considered as the scope of protection of the present disclosure.

What is claimed is:
1. A light collimation structure, comprising:
a light guide plate, the light guide plate comprising a light exiting side, a side opposite the light exiting side, and a light incident side connecting with the light exiting side and the side opposite the light exiting side; and
a light extraction unit on the light guide plate,
wherein the light extraction unit is configured to take out lights having a filtered first color having a narrow hand of spectrum, a filtered second color having a narrow band of spectrum, and a filtered third color having a narrow band of spectrum in the light guide plate to provide a collimated first color light, a collimated second color light and a collimated third color light;
the light extraction unit includes a grating structure comprising a plurality of sub-gratings, and a first light shielding layer which is at a first distance from the grating structure, the first light shielding layer comprising first absorption portions and first transmission portions which are alternately arranged in an array, and the first absorption portions and the first transmission portions are spaced apart from one another; and
an orthographic projection of each of the first transmission portions on the light guide plate completely covers an orthographic projection of one of the plurality of sub-gratings on the light guide plate.

2. The light collimation structure of claim 1, further comprising a filter film on the light guide plate,
wherein the filter film is configured to filter lights having a first color, a second color and a third color into the lights having the filtered first color having a narrow band of spectrum, the filtered second color having a narrow band of spectrum, and the filtered third color having a narrow band of spectrum.

3. The light collimation structure of claim 2, wherein, the filter film is on the light incident side of the light guide plate and the light extraction unit is on the light exiting side of the light guide plate.

4. The light collimation structure according to claim 3, wherein the light extraction unit further comprises a transition layer between the first light shielding layer and the grating structure, the first light shielding layer is on a surface of the transition layer opposite from the light guide plate, and the grating structure is in contact with the light guide plate and embedded into the transition layer.

5. The light collimation structure according to claim 4, wherein the transition layer comprises a resin layer having a reflective index in a range of 1 to 1.35 or an air gap.

6. The light collimation structure according to claim 3, wherein the light extraction unit further comprises a transition layer between the first light shielding layer and the grating structure, the transition layer is filled into the first transmission portions of the first light shielding layer and has a same height in a direction of perpendicular to a surface of the light-exiting side of the light guide plate as each of the first transmission portions, and the grating structure is in contact with the light guide plate and embedded into the transition layer.

7. The light collimation structure of claim 2, wherein the filter film is on the light exiting side of the light guide plate, the light extraction unit is on a side of the filter film opposite from the light guide plate, and the light extraction unit further comprises a transition layer between the first light shielding layer and the grating structure, the first light shielding layer is on a surface of the transition layer opposite from the light guide plate, and the grating structure is in contact with the filter film and embedded into the transition layer.

8. The light collimation structure of claim 2, wherein the filter film is on the light exiting side of the light guide plate, the light extraction unit is on a side of the filter film opposite from the light guide plate, and the light extraction unit further comprises a transition layer between the first light shielding layer and the grating structure, the transition layer is filled into the first transmission portions of the first light shielding layer and has a same height in a direction of perpendicular to a surface of the light-exiting side of the light guide plate as each of the first transmission portions, and the grating structure is in contact with the filter film and embedded into the transition layer.

9. The light collimation structure according to claim 2, wherein the grating structure is a reflective grating structure and on a side opposite from the light exiting side of the light guide plate and the first light shielding layer is on the light exiting side of the light guide plate.

10. The light collimation structure according to claim 9, wherein a metal layer is coated on the grating structure to form the reflective grating structure, and the metal layer comprises gold or silver.

11. The light collimation structure according to claim 9, wherein the filter film is on the light incident side of the light guide plate or between the reflective grating structure and the light guide plate.

12. The light collimation structure according to claim 2, wherein the filter film comprises a first color sub-film, a second color sub-film, and a third color sub-film on the light-exiting side of the light guide plate;
the first color sub-film, the second color sub-film, and the third color sub-film are configured to filter the lights having the first color, the second color and the third color into a light having the filtered first color having a narrow band of spectrum, a light having the filtered second color having a narrow band of spectrum, and a light having the filtered third color having a narrow band of spectrum respectively;
one of the plurality of sub-gratings is on a side of the first color sub-film, the second color sub-film, and the third color sub-film opposite from the light guide plate respective, and is configured to take out the light having the filtered first color having a narrow band of spectrum, the light having the filtered second color having a narrow band of spectrum, and the light having the filtered third color having a narrow band of spectrum to provide the collimated first color light, the collimated second color light and the collimated third color light, respectively.

13. The light collimation structure according to claim 12, wherein the light extraction unit further comprises a transition layer, and the transition layer covers the grating structure and the filter film.

14. The light collimation structure according to claim 2, further comprising
a light emitting unit disposed on the light incident side of the light guide plate for providing the lights having the first color, the second color and the third color to the light guide plate;
wherein the light emitting unit comprises:
a light source which is a white light LED, which emits the lights having the first color, the second color and the third color; and
a reflector for collimating the lights having the first color, the second color and the third color to form collimated lights and causing the collimated lights to be transmitted in the light guide plate in a total reflection manner.

15. The light collimation structure of claim 1, wherein one of the first transmission portions is between every two adjacent first absorption portions.

16. The light collimation structure according to claim 1, further comprising a light emitting unit disposed on the light incident side of the light guide plate for providing the lights having the filtered first color, the filtered second color and the filtered third color to the light guide plate;
wherein the light emitting unit comprises:
a light source comprising a plurality of narrow band spectral LEDs, which emit the lights having the filtered first color, the filtered second color and the filtered third color; and
a reflector for collimating the lights having the filtered first color, the filtered second color and the filtered third color to form collimated lights and causing the collimated lights to be transmitted in the light guide plate in a total reflection manner.

17. A display apparatus, comprising the light collimation structure of claim 1, and a display panel on the light exiting side of the light guide plate.

18. The display apparatus of claim 17, wherein the display panel comprises a gray scale control unit, which is configured to adjust transmission state of the collimated first color light, the collimated second color light and the collimated third color light,
wherein the gray scale control unit comprises:
a liquid crystal layer;
a second light shielding layer on a side of the liquid crystal layer opposite from the light guide plate, the second light shielding layer comprising second absorption portions and second transmission portion which are alternately arranged in an array, and the second absorption portions and the second transmission portions are spaced apart from one another and a control electrode, wherein the control electrode is configured to adjust deflection direction of liquid crystals in the liquid crystal layer and accordingly propagation direction of the collimated first color light, the collimated second color light and the collimated third color light incident on the liquid crystal layer such that each of the collimated first color light, the collimated second color light and the collimated third color light emitted from the liquid crystal layer is either absorbed by the second absorption portions or passed through the second light transmission portions, thereby adjusting the gray scale of the display panel, an orthographic projection of each of the second absorption portions on the light guide plate at least partially overlaps an orthographic projection of one of the plurality of sub-gratings on the light guide plate, respectively, the gray scale control unit further comprises a third light shielding layer, wherein the third light shielding layer comprises a plurality of third absorption portions, and each of the third absorption portions is disposed in the same layer as the second light shielding layer, and the third absorption portions are in one-to-one correspondence with the second transmission portions, and each of the third absorption portions divide one of the second transmission portions into a first sub-transmission portion and a second sub-transmission portion.

\* \* \* \* \*